United States Patent
He

(10) Patent No.: US 11,543,706 B2
(45) Date of Patent: Jan. 3, 2023

(54) PROCESSING METHOD AND SYSTEM FOR COLOR FILM SUBSTRATE

(71) Applicant: HKC Corporation Limited, Guangdong (CN)

(72) Inventor: Huailiang He, Guangdong (CN)

(73) Assignee: HKC Corporation Limited, Guangdong (CN)

( * ) Notice: Subject to any disclaimer, the term of this patent is extended or adjusted under 35 U.S.C. 154(b) by 144 days.

(21) Appl. No.: 17/041,583

(22) PCT Filed: Nov. 29, 2018

(86) PCT No.: PCT/CN2018/118140
§ 371 (c)(1),
(2) Date: Sep. 25, 2020

(87) PCT Pub. No.: WO2020/097992
PCT Pub. Date: May 22, 2020

(65) Prior Publication Data
US 2021/0018785 A1   Jan. 21, 2021

(30) Foreign Application Priority Data
Nov. 12, 2018   (CN) .......................... 201811339916.4

(51) Int. Cl.
*G02F 1/1339*   (2006.01)
*G02F 1/13*   (2006.01)
(Continued)

(52) U.S. Cl.
CPC ............ *G02F 1/13394* (2013.01); *B08B 3/08* (2013.01); *G02F 1/1303* (2013.01); *G02F 1/133516* (2013.01)

(58) Field of Classification Search
CPC ............. G02F 1/13394; G02F 1/13398; G02F 1/1303; G02F 1/1316; G02F 1/133516; G02F 1/1309
See application file for complete search history.

(56) References Cited

U.S. PATENT DOCUMENTS

2006/0209244 A1   9/2006   Yanagawa et al.
2017/0038615 A1*  2/2017   Liu ........................ G01B 21/02

FOREIGN PATENT DOCUMENTS

| CN | 101038351 A | 9/2007 |
|---|---|---|
| CN | 101551232 A | 10/2009 |

(Continued)

OTHER PUBLICATIONS

English language translation of Chinese Patent Application No. CN 107153305 published on Sep. 12, 2017. Original Chinese language document obtained on Apr. 12, 2022 from Espace.net at https://worldwide.espacenet.com/. Translation into English provided by Google Translate tool on the website. (Year: 2017).*

(Continued)

*Primary Examiner* — Angela K Davison
(74) *Attorney, Agent, or Firm* — Hauptman Ham, LLP

(57) ABSTRACT

A processing method for a color film substrate, the color film substrate comprising a substrate, a photoresist layer, a conductive layer and a spacer layer. The photoresist layer is disposed on the substrate; the conductive layer is disposed on the photoresist layer and completely covers the photoresist layer; and the spacer layer is disposed on the conductive layer. The method comprises: detecting the spacer layer; determining whether the spacer layer meets a preset condition; if the spacer layer meets the preset condition, removing the spacer layer using a rework liquid medicine so as to expose the conductive layer; and re-preparing a spacer layer on the exposed conductive layer, wherein the etching selec- (Continued)

tion ratio of the spacer layer to the conductive layer is greater than 1.

16 Claims, 2 Drawing Sheets

(51) Int. Cl.
  *B08B 3/08* (2006.01)
  *G02F 1/1335* (2006.01)

(56) References Cited

FOREIGN PATENT DOCUMENTS

| | | | |
|---|---|---|---|
| CN | 102707485 | A | 10/2012 |
| CN | 104849901 | A | 8/2015 |
| CN | 105425436 | A | 3/2016 |
| CN | 107153305 | A | 9/2017 |
| JP | 2002365641 | A | 12/2002 |

OTHER PUBLICATIONS

International Search Report for Application No. PCT/CN2018/118140, dated Jul. 30, 2019, 3 pages.
Chinese Office Action for Application No. 201811339916.4, dated Aug. 2, 2019, 6 pages.
Chinese Office Action for Application No. 201811339916.4, dated Apr. 2, 2020, 5 pages.

* cited by examiner

PROCESSING METHOD AND SYSTEM FOR COLOR FILM SUBSTRATE

CROSS REFERENCE TO RELATED APPLICATIONS

This application is a U.S. National Stage application of, and claims priority to, PCT/CN2018/118140, filed Nov. 29, 2018, which further claims priority to Chinese Patent Application No. 201811339916.4, filed Nov. 12, 2018, the entire contents of which are incorporated herein in their entirety.

TECHNICAL FIELD

The present disclosure relates to the field of display technologies, and more particularly relates to a processing method and system of a color film substrate.

BACKGROUND

The statements in this section merely provide background information related to the present disclosure and may or may not constitute prior art.

With the continuous development of the society, liquid crystal display (LCD) technology has replaced the cathode ray tube (CRT) imaging technology to become the mainstream.

Generally, a liquid crystal display panel includes a color film substrate and an array substrate aligned with the color film substrate. A liquid crystal is provided between the color film substrate and the array substrate.

When preparing a spacer layer of the color film substrate, if the spacer layer continues to be used in the presence of technical defects, the quality of the entire color film substrate and even the liquid crystal display panel will be seriously affected.

SUMMARY

According to various embodiments of present disclosure, a method and system of processing a color film substrate are provided.

A method of processing a color film substrate is provided. The color film substrate includes a substrate, a photoresist layer, a conductive layer, and a spacer layer. The photoresist layer is disposed on the substrate. The conductive layer is disposed on the photoresist layer and completely covers the photoresist layer. The spacer layer is disposed on the conductive layer. The method includes:

detecting the spacer layer;

determining whether the spacer layer satisfies a predetermined condition;

if the spacer layer satisfies the predetermined condition, removing the spacer layer using a rework stripper to expose the conductive layer; and re-preparing a spacer layer on the exposed conductive layer;

an etch selectivity of the spacer layer to the conductive layer is greater than 1.

In the aforementioned method of processing the color film substrate, by detecting the spacer layer and determining whether the spacer layer satisfies the predetermined condition, when the spacer layer satisfies the predetermined condition, it can be determined that the spacer layer cannot satisfy the use requirement, and optionally, the rework stripper can be used to remove the spacer layer. During the process of removing the spacer layer, by ensuring that the etch selectivity of the spacer layer to the conductive layer is greater than 1, the rework stripper can be prevented from causing damage to the conductive layer and the photoresist layer located under the conductive layer. It is only necessary to re-prepare the spacer layer without re-preparing the conductive layer and the photoresist layer, which greatly simplifies the rework process and saves the rework cost.

A method of processing a color film substrate is provided. The color film substrate includes a substrate, a photoresist layer, a conductive layer, and a spacer layer. The photoresist layer is disposed on the substrate. The conductive layer is disposed on the photoresist layer and completely covers the photoresist layer. The spacer layer is disposed on the conductive layer. The method includes:

detecting the spacer layer;

determining whether the spacer layer satisfies a predetermined condition;

heating a rework stripper to a temperature of 30° C. to 80° C. if the spacer layer satisfies the predetermined condition, and removing the spacer layer using the rework stripper to expose the conductive layer; and re-preparing a spacer layer on the exposed conductive layer;

an etch selectivity of the spacer layer to the conductive layer is greater than 1.

A system of processing a color film substrate is provided. The color film substrate includes a substrate, a photoresist layer, a conductive layer, and a spacer layer. The photoresist layer is disposed on the substrate. The conductive layer is disposed on the photoresist layer and completely covers the photoresist layer. The spacer layer is disposed on the conductive layer. The system includes:

a detecting device configured to detect the spacer layer;

a determining device configured to determine whether the spacer layer satisfies a predetermined condition; and a processing device configured to remove the spacer layer using a rework stripper to expose the conductive layer, when the spacer layer satisfies the predetermined condition, and to re-prepare a spacer layer on the exposed conductive layer;

an etch selectivity of the spacer layer to the conductive layer is greater than 1.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

Figure 1:
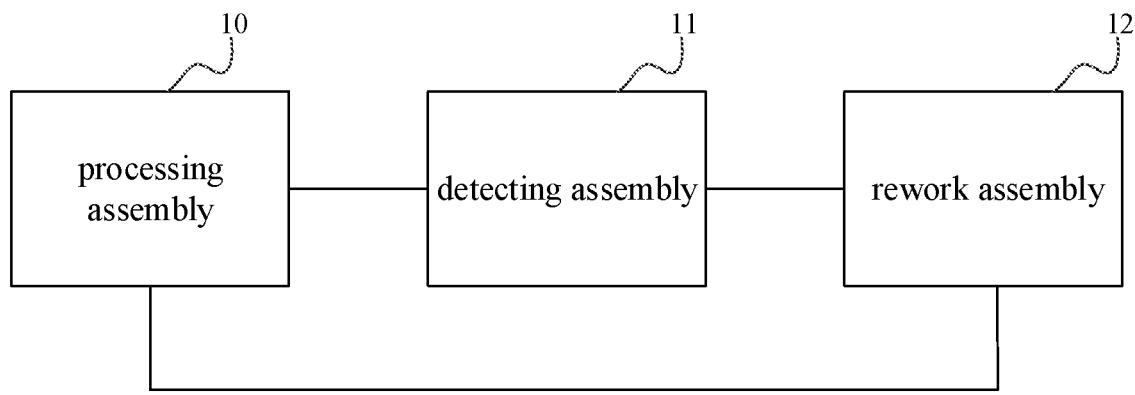
FIG. 1 is a schematic view of a system of processing a color film substrate according to an embodiment.

In order to make the objective, technical solutions and advantages of the present disclosure more clear, the present disclosure will be further described in detail below with reference to the accompanying drawings and embodiments. It is understood that the specific embodiments described herein are merely illustrative of the application and are not intended to be limiting.

In the description of the present disclosure, it will be understood that, the orientation or positional relationship of the terms "center", "transverse", "vertical", "horizontal", "top", "bottom", "inner", and "outside" is based on the orientation or positional relationship shown in the drawings, and is merely for the convenience of the description and the simplified description, rather than indicating or implying that the device or component referred to has a particular orientation, construction and operation in a particular orientation, it is not to be construed as a limitation. In addition, it should be noted that when an element is referred to as "formed on another element", it can be directly connected to the other element or intervening elements may be present. When an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

The present embodiment provides a method of processing a color film substrate. The color film substrate in the present embodiment may include film layer structures such as a substrate, a photoresist layer, a conductive layer, and a spacer layer. The photoresist layer may be disposed on the substrate, and the conductive layer may be disposed on the photoresist layer and completely cover the photoresist layer. The spacer layer may be disposed on the conductive layer. The aforementioned method of processing the color film substrate may specifically include the following steps:

In step S1, the spacer layer is detected.

Specifically, the spacer layer can be firstly detected by using a detection technique such as optical detection or ultrasonic detection, and the corresponding detection data is obtained. In an embodiment, the size, shape, and other specification parameters of each spacer in the spacer layer may be detected, and the number of spacers that do not satisfy the corresponding normal specification parameters can be counted accordingly. However, in alternative embodiments, it is also possible to detect the height, integrity, and the like of the entire spacer layer.

In step S2, it is determined whether the spacer layer satisfies a predetermined condition.

In an embodiment, the detected data obtained after the detection can be compared with the normal data, that is, the predetermined condition. It should be understood by those skilled in the art that, the detected data obtained by the aforementioned steps corresponds to the predetermined condition. When the detected data includes the number of spacers that do not satisfy the specification parameter, the predetermined condition may correspondingly include a corresponding threshold of the number of the spacers that do not satisfy the specification parameter. When the detected data includes a ratio of the number of the spacers that do not satisfy the specification parameter to the total number of the spacers, the predetermined condition may correspondingly include a predetermined ratio of the number of the spacers that do not satisfy the specification parameter to the total number of the spacers.

In step S3, if the spacer layer satisfies the predetermined condition, the spacer layer is removed using a rework stripper to expose the conductive layer.

In an embodiment, when the detected data satisfies the predetermined condition, it can be determined that the spacer layer cannot satisfy the condition for continued use. Optionally, the spacer layer may be removed using the rework stripper and the conductive layer located under the spacer layer may be exposed.

In an embodiment, in order to ensure that the spacer layer is removed without excessive damage to the conductive layer, an etch selectivity of the spacer layer to the conductive layer should be greater than 1, that is, a reaction rate between the rework stripper and the spacer layer should be greater than a reaction rate between the rework stripper and the conductive layer.

In step S4, a spacer layer is re-prepared on the exposed conductive layer.

Specifically, after the spacer layer is removed by the rework stripper, the entire array substrate can be washed and dried, and after adjusting a corresponding preparation parameter and environmental parameter, a new spacer layer is newly prepared on the conductive layer, thereby ensuring that the newly prepared spacer layer can satisfy the use requirements.

In the aforementioned embodiments, by detecting the spacer layer and determining whether the spacer layer satisfies the predetermined condition, when the spacer layer satisfies the predetermined condition, it can be determined that the spacer layer cannot satisfy the use requirement, and optionally, the rework stripper can be used to remove the spacer layer. During the process of removing the spacer layer, by ensuring that the etch selectivity of the spacer layer to the conductive layer is greater than 1, the rework stripper can be prevented from causing damage to the conductive layer and the photoresist layer located under the conductive layer. It is only necessary to re-prepare the spacer layer without re-preparing the conductive layer and the photoresist layer, which greatly simplifies the rework process and saves the rework cost.

In an embodiment, since the spacer layer is generally a resin material, in order to better remove the spacer layer, potassium hydroxide solution may be used as the rework stripper, and potassium hydroxide may attack the reaction chain portion of the photoresist resin to remove the spacer layer. However, in order to minimize damage to the conductive layer by the rework stripper, in some embodiments, ethylene glycol and ammonia may also be added into the rework stripper.

In some embodiments, since the reaction rate between the rework stripper and the spacer layer is greater than the reaction rate between the rework stripper and the conductive layer, by setting the concentration of the rework stripper to be 50% by weight to 100% by weight, for example, 50%, 60%, 70%, 80%, 90%, 100% by weight, or the like, the reaction rate between the rework stripper and the spacer layer is optionally increased, thereby optionally increasing the etch selectivity of the spacer layer to the conductive layer, so that the conductive layer is optionally prevented from being damaged while accelerating the removal of the spacer layer.

In some embodiments, it is also possible to control the action time of the rework stripper and the spacer layer to be 2 min to 20 min, for example, 2 min, 5 min, 10 min, 15 min, 20 min, and the like, which can minimize the contact time between the rework stripper and the conductive layer to cause damage to the conductive layer, while ensuring that the spacer layer can be completely removed.

In some embodiments, in order to optionally increase the reaction rate between the rework stripper and the spacer layer, ultrasonic waves may also be applied simultaneously during the action of the rework stripper and the spacer layer. The ultrasonic wave can stir the rework stripper at a high frequency, so that the rework stripper can be fully contacted and reacted with the spacer layer, thereby more efficiently removing the spacer layer, and avoiding the residual of the spacer layer due to insufficient reaction between the rework stripper and the spacer layer.

To enable a person skilled in the art to fully understand the present disclosure, the present disclosure will be described below in combination with the accompanying drawings.

FIG. 1 is a schematic view of a system of processing a color film substrate according to an embodiment. Referring to FIG. 1, the present embodiment provides a system of processing a color film substrate, which may specifically include a processing assembly 10, a detecting assembly 11, and a rework assembly 12. The processing assembly 10 can be connected to the detecting assembly 11, and the rework assembly 12 can be connected to the detecting assembly 11 and the processing assembly 10, respectively.

In an embodiment, the processing assembly 10, the detecting assembly 11, and the rework assembly 12 can each be disposed on a processing station (not shown). The processing assembly 10 can sequentially prepare various layer structures of the color film substrate such as a substrate, a photoresist layer, a conductive layer, and a spacer layer on the processing station. When the processing assembly 10 prepares the conductive layer, the prepared conductive layer can completely cover the photoresist layer underneath to prevent the rework stripper from contacting the photoresist layer and causing damage to the photoresist layer when the rework stripper is used to remove the spacer layer. Therefore, it is unnecessary to re-prepare the photoresist layer, thereby achieving the purpose of saving process and processing cost.

In an embodiment, the detecting assembly 11 can monitor the current processing procedure of the current processing assembly 10. After monitoring that the processing assembly 10 completes the preparation process of the spacer layer, the detecting assembly 11 can control the continued processing of the processing assembly 10 to stop, and can immediately detect the current spacer layer. In addition, when it is detected that the spacer layer cannot satisfy the normal use requirement, that is, when the spacer satisfies the predetermined condition, the rework assembly 12 is triggered to start working.

In an embodiment, after the rework assembly 12 starts working, a rework stripper can be sprayed on the spacer layer. The reaction rate between the rework stripper and the spacer layer is faster than the reaction rate between the rework stripper and the conductive layer. In other words, an etch selectivity of the spacer layer to the conductive layer is greater than 1, so as to ensure that the conductive layer is not excessively damaged even if the rework stripper is sprayed on the conductive layer.

In an embodiment, after the rework assembly 12 completely removes the spacer layer, the conductive layer will be fully exposed, then the rework assembly 12 can trigger the processing assembly 10 to start working. The processing assembly 10 can re-prepare the spacer layer on the exposed conductive layer.

In the aforementioned system of processing the color film substrate, by detecting the spacer layer and determining whether the spacer layer satisfies the predetermined condition, when the spacer layer satisfies the predetermined condition, it can be determined that the spacer layer cannot satisfy the use requirement, and optionally, the rework stripper can be used to remove the spacer layer. During the process of removing the spacer layer, by ensuring that the etch selectivity of the spacer layer to the conductive layer is greater than 1, the rework stripper can be prevented from causing damage to the conductive layer and the photoresist layer located under the conductive layer. It is only necessary to re-prepare the spacer layer without re-preparing the conductive layer and the photoresist layer, which greatly simplifies the rework process and saves the rework cost.

In an embodiment, the detecting assembly 11 can detect the specification parameters such as the size and shape of each spacer in the spacer layer, and correspondingly count the number of spacers that do not satisfy the corresponding normal specification parameters. Optionally, a threshold is predetermined in the detecting assembly 11. When the detecting assembly 11 detects that the number of the spacers that do not satisfy the specification parameter exceeds the threshold, it may be determined that the spacer layer needs to be reworked.

Figure 2:
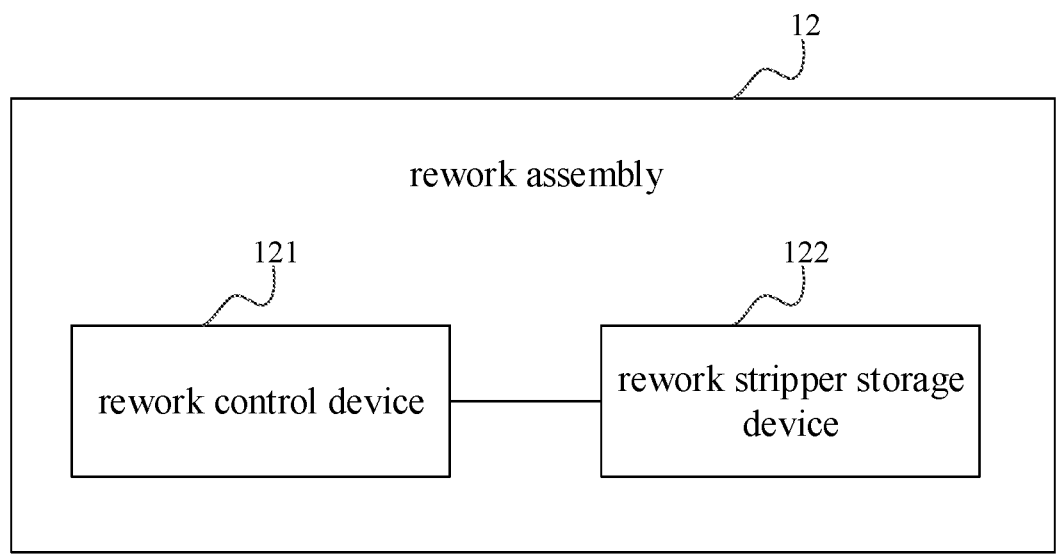
FIG. 2 is a schematic view of the rework assembly in FIG. 1.

FIG. 2 is a schematic view of the rework assembly in FIG. 1. Referring to FIG. 2, in an embodiment, the rework assembly 12 optionally includes a rework control device 121 and a rework stripper storage device 122. The rework control device 121 can be connected to the detecting assembly 11 and the processing assembly 10, respectively. The rework stripper storage device 122 can be connected to the rework control device 121.

In an embodiment, the rework stripper storage device 122 may store the rework stripper. The rework stripper may be a potassium hydroxide solution. However, in order to minimize damage to the conductive layer by the rework stripper, in some embodiments, ethylene glycol and ammonia may also be added into the rework stripper.

In an embodiment, the concentration of the rework stripper stored in the rework stripper storage device 122 may be 50% by weight to 100% by weight, for example, 55%, 65%, 75%, 85%, 95% by weight, etc., to increase the reaction rate between the rework stripper and the spacer layer, thereby optionally increasing the etch selectivity of the spacer layer to the conductive layer, so that the conductive layer is optionally prevented from being damaged while accelerating the removal of the spacer layer.

In an embodiment, when the detecting assembly 11 determines that the spacer layer needs to be reworked, the rework control device 121 can control the rework stripper storage device 122 to spray a specified dosage of rework stripper. The rework control device 121 can control the reaction time of the rework stripper and the spacer layer, and trigger the processing assembly 10 to start working after the specified reaction time. Since the spacer layer has been completely removed at this time, the conductive layer originally located under the spacer layer has been completely exposed, the processing assembly 10 can perform processing processes such as cleaning, drying, and the like on the current color film substrate, and re-prepare the spacer layer on the conductive layer.

In an embodiment, in order to minimize the contact time between the rework stripper and the conductive layer to cause damage to the conductive layer, while ensuring that the spacer layer is completely removed, the rework control device 121 can control the action time of the rework stripper and the spacer layer to be 2 min to 20 min, for example, 3 min, 6 min, 9 min, 12 min, 16 min, 18 min, and the like.

In an embodiment, the rework control device 121 can also apply ultrasonic waves to the rework stripper while controlling the rework stripper storage device 122 to spray the rework stripper. Since the ultrasonic wave can stir the rework stripper at a high frequency, so that the rework stripper can be fully contacted and reacted with the spacer layer, thereby more efficiently removing the spacer layer, and avoiding the residual of the spacer layer due to insufficient reaction between the rework stripper and the spacer layer.

Figure 3:
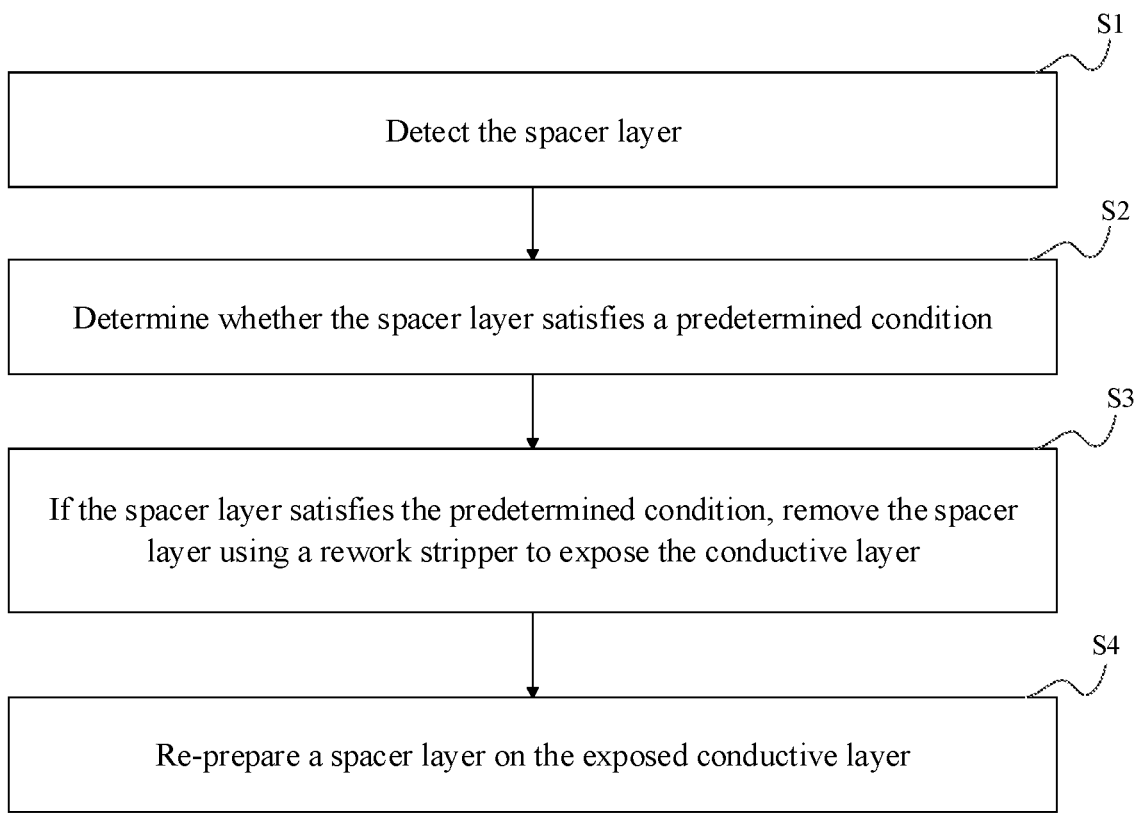
FIG. 3 is a flowchart of a method of processing a color film substrate according to an embodiment.

FIG. 3 is a flowchart of a method of processing a color film substrate according to an embodiment. Referring to FIG. 3, based on the system of processing the color film substrate in the aforementioned embodiments, the present embodiment provides a method of processing a color film substrate, and the method may include:

In step S1, the spacer layer is detected.

In an embodiment, the currently prepared spacer layer can be detected using an automatic optic inspection (AOI) device. For ease of understanding, the automatic optical inspection device here detects the size of the spacer for explanation. It may be assumed that the maximum diameter of each of the detected spacers is 3 nm, 4 nm, 5 nm, and 6 nm, respectively. The automatic optical inspection device can be predetermined with a normal specification threshold such as 5 nm to 6 nm, so that the number of the spacers that do not satisfy the requirements can be counted as 2.

In step S2, it is determined whether the spacer layer satisfies a predetermined condition.

In an embodiment, the predetermined condition may be the number of the spacers that do not satisfy the specification parameter, and the number may be set by a person skilled in the art according to actual needs, and may be designed herein to be greater than or equal to 2.

In step S3, if the spacer layer satisfies the predetermined condition, the spacer layer is removed using the rework stripper to expose the conductive layer.

In an embodiment, when the number of the spacers that do not satisfy the requirements is counted as 2, and the predetermined condition, that is, the number of the spacers that do not satisfy the specification parameter is set to 2, it can be determined that the spacer layer satisfies the predetermined condition. Therefore, the spacer layer is optionally removed using the rework stripper and the conductive layer is exposed.

In an embodiment, in order to ensure that the spacer layer is removed without excessive damage to the conductive layer, an etch selectivity of the spacer layer to the conductive layer should be greater than 1, that is, a reaction rate between the rework stripper and the spacer layer should be greater than a reaction rate between the rework stripper and the conductive layer.

In step S4, a spacer layer is re-prepared on the exposed conductive layer.

In an embodiment, after the spacer layer is removed by using the rework stripper, since the remaining rework stripper and the spacer layer debris may still exist on the color film substrate, the color film substrate may be firstly washed and dried, and then the spacer layer is re-prepared on the exposed conductive layer after drying.

In the aforementioned method of processing the color film substrate, by detecting the spacer layer and determining whether the spacer layer satisfies the predetermined condition, when the spacer layer satisfies the predetermined condition, it can be determined that the spacer layer cannot satisfy the use requirement, and optionally, the rework stripper can be used to remove the spacer layer. During the process of removing the spacer layer, by ensuring that the etch selectivity of the spacer layer to the conductive layer is greater than 1, the rework stripper can be prevented from causing damage to the conductive layer and the photoresist layer located under the conductive layer. It is only necessary to re-prepare the spacer layer without re-preparing the conductive layer and the photoresist layer, which greatly simplifies the rework process and saves the rework cost.

It should be noted that the limitation of each step involved in the present solution is not determined as limiting the sequence of steps without affecting the implementation of the specific solution. The steps written in the previous steps can be performed firstly, or later, or even simultaneously. As long as the solution can be implemented, it should be considered as belonging to the scope of protection of the present disclosure.

Although the respective embodiments have been described one by one, it shall be appreciated that the respective embodiments will not be isolated. Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

The foregoing descriptions are merely specific embodiments of the present invention, but are not intended to limit the protection scope of the present invention. Any variation or replacement readily figured out by a person skilled in the art within the technical scope disclosed in the present invention shall all fall within the protection scope of the present invention. Therefore, the protection scope of the present invention shall be subject to the protection scope of the appended claims.

What is claimed is:

1. A method of processing a color film substrate, wherein the color film substrate comprises a base plate, a photoresist layer, a conductive layer, and a spacer layer; the photoresist layer is disposed on the base plate, the conductive layer is disposed on the photoresist layer and completely covers the photoresist layer, the spacer layer is disposed on the conductive layer, the method comprises:

detecting the spacer layer;

determining whether the spacer layer satisfies a condition, wherein the spacer layer comprises a plurality of spacers, the condition comprises that the number of spacers whose specification parameters each do not satisfy a normal specification parameter exceeds a threshold, and a specification parameter comprises a size and a shape of each spacer in the spacer layer;

if the spacer layer satisfies the condition, removing the spacer layer using a rework stripper to expose the conductive layer, and re-preparing a spacer layer on the exposed conductive layer, wherein a ratio of a reaction rate between the rework stripper and the spacer layer to a reaction rate between the rework stripper and the conductive layer is greater than 1; and if the spacer layer does not satisfy the condition, refraining from removing the spacer layer and re-preparing the spacer layer.

2. The method according to claim 1, wherein the step of removing the spacer layer using the rework stripper comprises:

heating the rework stripper to a temperature of 30° C. to 80° C.; and removing the spacer layer using the rework stripper.

3. The method according to claim 1, wherein the step of removing the spacer layer using the rework stripper comprises:

removing the spacer layer using the rework stripper under an ultrasonic process.

4. The method according to claim 1, wherein the step of detecting the spacer layer; determining whether the spacer layer satisfies the condition; and if the spacer layer satisfies the condition, removing the spacer layer using the rework stripper to expose the conductive layer comprises:
detecting a specification parameter of each of the spacers, and counting the number of the spacers whose specification parameters each do not satisfy the normal specification parameter; determining the spacer layer satisfies the condition if the number of the spacers whose specification parameters each do not satisfy the normal specification parameter exceeds the threshold, and removing the spacer layer using the rework stripper to expose the conductive layer.

5. The method according to claim 1, wherein the detecting the spacer layer comprises optically detecting the spacer layer.

6. The method according to claim 1, wherein the detecting the spacer layer comprises ultrasonically detecting the spacer layer.

7. The method according to claim 1 further comprising: before removing the spacer layer using the rework stripper to expose the conductive layer, applying ultrasonic waves to the rework stripper to stir the rework stripper.

8. The method according to claim 1, wherein the spacer layer is a resin material.

9. The method according to claim 1, wherein a solute of the rework stripper comprises potassium hydroxide.

10. The method according to claim 9, wherein the solute of the rework stripper further comprises ethylene glycol and ammonia.

11. The method according to claim 1, wherein a concentration of the rework stripper is from 50% by weight to 100% by weight.

12. The method according to claim 11, wherein the concentration of the rework stripper is any one of 50%, 60%, 70%, 80%, 90%, and 100% by weight.

13. The method according to claim 1, wherein a time of reaction between the rework stripper and the spacer layer ranges from 2 min to 20 min.

14. The method according to claim 13, wherein the time of reaction between the rework stripper and the spacer layer is any one of 2 min, 5 min, 10 min, 15 min, and 20 min.

15. A method of processing a color film substrate, wherein the color film substrate comprises a base plate, a photoresist layer, a conductive layer, and a spacer layer; the photoresist layer is disposed on the base plate, the conductive layer is disposed on the photoresist layer and completely covers the photoresist layer, the spacer layer is disposed on the conductive layer, the method comprises:
detecting the spacer layer;
determining whether the spacer layer satisfies a condition, wherein the spacer layer comprises a plurality of spacers, the condition comprises that the number of spacers whose specification parameters each do not satisfy a normal specification parameter exceeds a threshold, and a specification parameter comprises a size and a shape of each spacer in the spacer layer;
heating a rework stripper to a temperature of 30° C. to 80° C. if the spacer layer satisfies the condition, removing the spacer layer using the rework stripper to expose the conductive layer, and re-preparing a spacer layer on the exposed conductive layer, wherein a ratio of a reaction rate between the rework stripper and the spacer layer to a reaction rate between the rework stripper and the conductive layer is greater than 1; and
if the spacer layer does not satisfy the condition, refraining from removing the spacer layer.

16. A system of processing a color film substrate, comprising:
a processing assembly configured to prepare the color film substrate; wherein the color film substrate comprises a base plate, a photoresist layer, a conductive layer, and a spacer layer;
the photoresist layer is disposed on the base plate, the conductive layer is disposed on the photoresist layer and completely covers the photoresist layer, the spacer layer is disposed on the conductive layer;
a detecting assembly connected to the processing assembly and configured to detect the spacer layer and determine whether the spacer layer satisfies a condition, wherein the spacer layer comprises a plurality of spacers, the condition comprises that the number of spacers whose specification parameters each do not satisfy a normal specification parameter exceeds a threshold, and a specification parameter comprises a size and a shape of each spacer in the spacer layer;
a rework assembly connected to the detecting assembly and the processing assembly, respectively and configured to remove the spacer layer using a rework stripper to expose the conductive layer, when the spacer layer satisfies the condition, and to trigger the processing assembly to re-prepare a spacer layer on the exposed conductive layer, wherein a ratio of a reaction rate between the rework stripper and the spacer layer to a reaction rate between the rework stripper and the conductive layer is greater than 1; and
if the spacer layer does not satisfy the condition, refraining from removing the spacer layer.

\* \* \* \* \*